Oct. 30, 1934.  W. F. OTTE  1,978,596

CONTAINER

Filed Nov. 13, 1933

INVENTOR.
WERNER F. OTTE
BY Richards & Geier
ATTORNEYS.

Patented Oct. 30, 1934

1,978,596

UNITED STATES PATENT OFFICE 1,978,596

CONTAINER

Werner F. Otte, Passaic, N. J.

Application November 13, 1933, Serial No. 697,703

3 Claims. (Cl. 65—57)

This invention refers to containers and relates more particularly to saltcellars, peppercellars, shakers for sugar, grated cheese, etc. and similar table and kitchen ware.

Cellars, shakers and similar containers are provided with a cover having a number of holes through which salt or other granulated substance may be removed from the container. The granulated substance often forms large lumps, particularly under the effect of moisture, so that it cannot pass through the narrow holes provided in the cover. Furthermore, these holes are often clogged by small particles of the granulated substance which stick to the cover and to the edges of the holes.

To insure a free passage of the granulated substance through the holes of the cover, it is therefore, necessary not only to maintain the granulated substance in a finely divided state, but also to clean the cover from time to time.

An object of the present invention is the provision of a simple and inexpensive mechanical device for comminuting the granulated substance filling a container and for scraping the walls of the cover of said container in order to prevent the clogging of the openings provided in said cover.

The above and other objects of this invention may be realized through the provision of an elongated bent member, which is situated within a container and which is used for comminuting a granulated substance, i. e. for breaking up the lumps formed by this substance. This member also serves as a carrier for a scraping device adapted to clean the openings provided in the cover of the container. To insure the free passage of the granulated substance through the holes of the cover, it is advisable to combine the actions of these scraping and comminuting means.

The invention will appear more clearly from the following detailed description when taken in connection with the accompanying drawing showing preferred embodiments of the inventive idea.

Figure 1:
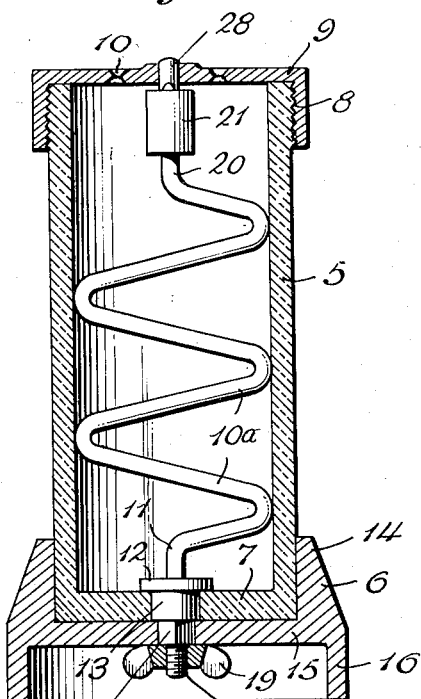
Figure 1 is a vertical section through a container comprising a device constructed in accordance with the principles of the present invention.
Figure 2:
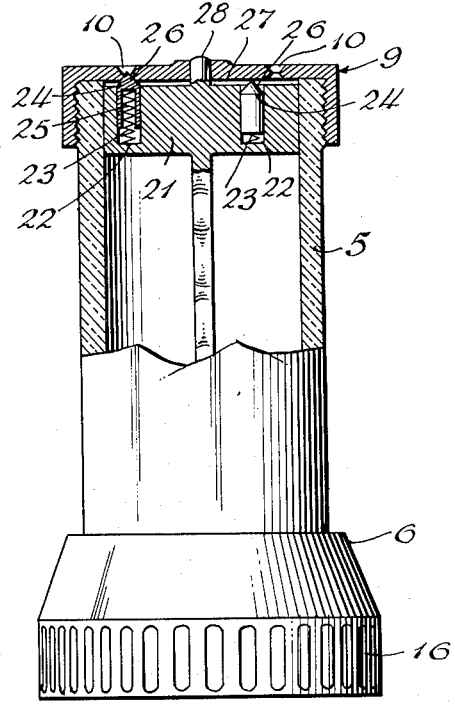
Figure 2 shows the same container partly in side elevation and partly in vertical section taken at right angles to that of Figure 1.
Figure 3:
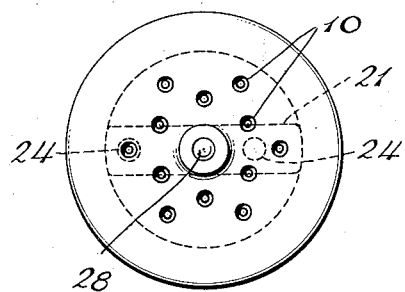
Figure 3 is a top view of the container illustrated in Figures 1 and 2.

The cellar or shaker illustrated in Figures 1, 2 and 3 of the drawing comprises a main cylindrical body 5, which is carried by a base 6. The hollow cylinder 5 is provided with a bottom 7. The upper end of the cylinder 5 is open and is provided with outer screw threads 8.

A cover 9 is screwed on top of the cylinder 5 and is provided with a number of small openings or holes 10, at least some of which are preferably located at equal distances from the vertical central axis of the cover 9, as shown in Figure 3.

The bottom 7 is provided with a round central opening and a corresponding smaller opening is formed in the middle of the cover 9.

A spiral-shaped member 10a, which is preferably made of a bent rod, is situated within the cylinder 5. The lower end 11 of the spiral 10 is rigidly connected with a disk 12, which forms a continuation of the spiral 10a and is rigidly connected with a cylindrical body 13 located in the round central opening formed in the bottom 7.

The base 6, which carries the cylinder 5 is provided with side walls 14, a web portion 15, which carries the bottom 7, and an annular stand 16.

A preferably square hole is formed in the central portion of the web 15. A square piece 17 which fits into this opening, forms a single body with the spiral 10a, the disc 12 and the cylindrical body 13. The square piece 17 carries a screw 18, which projects into the space surrounded by the web 15 and the stand 16. A winged nut 19 is screwed onto a screw 18, and is used for interconnecting the web 15 and the bottom 7.

Due to this arrangement, the cylinder 5 is attached to the base 6, although it can rotate with respect to this base. The spiral 10a is prevented from rotating along with the cylinder 5 by the square piece 17 which fits into a corresponding opening formed in the web 15.

The upper end 20 of the spiral 10a carries a member 21, which is firmly connected therewith. The member 21 serves as a carrier for a scraping device used for removing the granules and other particles clogging the openings 10 of the cover 9.

The member 21 is provided with bores 22, which are arranged in such a way, that their distances from the common vertical axis of the member 21 and the cover 9 are equal to the distances of at least some of the openings 10 from the same central axis, so that in the course of rotation of the cover 9, the holes 10 will pass directly above the bores 22.

The bores 22 end at a certain distance from the bottom of the member 21 and carry coiled springs 23, which press against the bottom of these bores. Cylindrical pins 24 are situated within the bores 22. The springs 23 project into the spaces 25 within the hollow pins 24 and press against these pins tending to push them upward. The ends 26 of the pins 24 are conical in shape and fit into the openings 10.

As shown in Figure 2 of the drawing, each of the openings 10 formed in the cover 9, has preferably the shape of a double cone, the smallest diameter common to both cones being in the middle of said double cone.

Usually, the pins 10 are situated practically entirely within the bores 22 of the member 21 and the ends 26 of these pins press against the bottom surface 27 of the cover 9.

A pin 28 forms a single body with the member 21 and projects through a central opening formed in the cover 9.

To prevent the formation of lumps of salt or other granulated substances filling the container shown in Figures 1, 2 and 3 of the drawing, and to keep the openings 10 of this container free, it is merely necessary to rotate a few times the cylinder 5, along with the cover 9, with respect to the base 6.

The cylinder 5 revolves around the spiral 10a, since the bottom 7 of the cylinder 5 is rotatable with respect to the cylindrical body 13, which forms a continuation of the spiral 10a and which passes through the central opening formed in the bottom 7.

The spiral 10a will be prevented from rotating along with the cylinder 5 due to the provision of the square piece 17 fitting into a corresponding opening formed in the web 15 of the base 6.

While the cylindrical body 5 is being revolved, any lumps formed by the granulated substance situated within the container will be crushed by the action of the spiral 10a. The spiral 10a will also remove most of the granules which adhere to the inner walls of the cylinder 5.

Since the cover 9 rotates along with the cylinder 5 a position will be reached in the course of the rotation when one or some of the openings 10 of the cover 9 will be situated just above one or some of the pins 24. In that position, which is shown in Figure 2, the ends 26 of the pins 24 will be pressed into the openings 10 by the action of the springs 23.

Due to the conical shape of the ends 26, they will be pressed downward in the course of further rotation of the cover 9 until other openings 10 will appear above the pins 24.

The ends 26 while passing into and out of the openings 10, will remove all granules and other particles adhering to the side walls of the openings 10 and will keep these openings clean.

Figure 4:
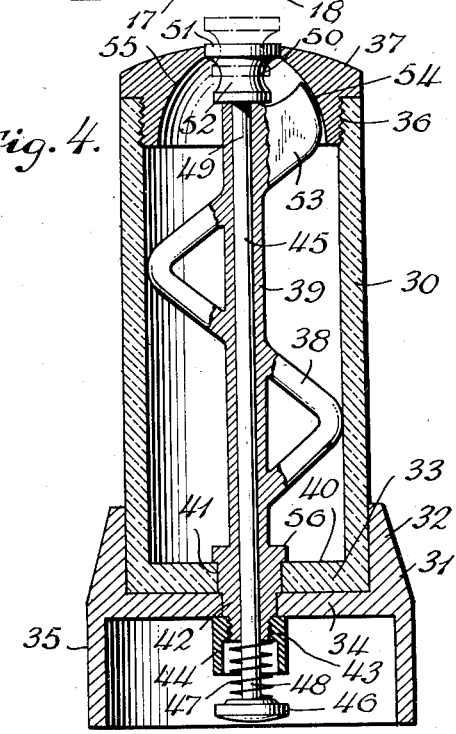
Figure 4 is a vertical section through a modified form of the inventive idea.

The container illustrated in Figure 4 of the drawing comprises a cylindrical body 30 carried by a base 31. The base 31 is similar to that shown in Figures 1 and 2 and comprises side walls 32 surrounding the bottom 33 of the cylinder 30, a web 34 supporting the bottom 33, and a stand 35.

The open end of the hollow cylinder 30 is provided with inner screw threads 36. A cover 37 which is provided with a single large central opening, is screwed into the open upper end of the container 30. A spiral 38 is situated within the container 30 and forms a single piece with a hollow sleeve 39. The sleeve 39 is provided at its lower end with a flange 56, which presses against the inner surface 40 of the bottom 33.

Hollow sleeves 41 and 42 are firmly connected with the flange 56 and form a continuation of the sleeve 39. The sleeve 41 is situated within a corresponding central opening formed in the bottom 33 of the cylinder 30. The sleeve 42 is preferably square or rectangular in shape and is located in a similarly shaped opening formed in the middle of the web 34 of the base 31. A screw 43 forms a continuation of the sleeve 42 and carries a nut 44.

A central rod 45 passes through the sleeve 39 and is movable in the direction of its vertical axis within said sleeve. The lower end of the rod 45 carries a button 46.

A coiled spring 47 surrounds the lower end 48 of the rod 45 and rests against the button 46. The upper end of the spring 47 presses against the screw 43. The greater portion of the spring 47 is surrounded by the side walls of the nut 44.

The upper end 49 of the rod 45 is provided with a stopper 50 which consists of an upper disc 51 fitting into the corresponding central opening formed in the cover 37, and a lower portion 52 which is smaller in size than the opening formed in the cover 37.

A scraper 53 forms an integral body with the sleeve 39 and is provided with edges 54 which are shaped in conformity with the inner walls 55 of the cover 37.

In order to remove the salt, pepper, sugar or other granulated substances from the cylinder 30, it is necessary to press the button 46 upward. Then the spring 47 will be compressed and the rod 45 will move upwards until the stopper 50 will be moved into a position shown in broken lines in Figure 4. If the container is placed upside down, the granulated substance will be able to pass freely through the opening provided in the middle of the cover 37 and around the lower portion 52 of the stopper 50.

However, before removing the granulated substance from the container it is advisable to rotate a few times the cylinder 30 with respect to its base 31. Due to the cylindrical shape of the sleeve 41 and to the rectangular shape of the sleeve 42, the cylinder 30 will rotate freely along with the cover 37, while the spiral 38 will not be rotated. Any lumps formed by the granulated substance will be removed by the spiral 38, while granules adhering to the inner walls 55 of the cover 37 will be removed by the relative movement of these walls with respect to the scraper 53.

What is claimed is:

1. A container, comprising a hollow body, a cover closing said body, said cover being provided with at least one opening, a spiral-shaped member within said body, said spiral-shaped member and said body being relatively movable with respect to each other, another member carried by the spiral-shaped member, a pin carried by the second-mentioned member, and resilient means carried by the second-mentioned member and adapted to press said pin against the walls of said opening to scrape the same during the relative movement between said spiral-shaped member and said body.

2. A container, comprising a hollow body having a bottom and side walls, a cover closing said body and having at least one opening formed therein, a base carrying said body, a spiral-shaped member within said body, means forming a continuation of said spiral-shaped member and projecting through openings formed in said bottom and said base, and firmly held against rotation relative to said base by engagement with the said opening in said base, said body and said cover being movable relatively to said member and said base, another member carried by said spiral-shaped member adjacent to said cover, a pin carried by the second-mentioned member, and resilient means carried by the second-mentioned member and pressing against said pin, whereby said pin is pressed against the walls of said opening to scrape the same during the relative movement between said spiral-shaped member and said body.

3. A container, comprising a hollow body having cylindrical walls and a bottom, a cover screwed on the top of said body, a base carrying said body, said cover being provided with a plurality of openings, a spiral-shaped member within said body, a cylindrical member forming a continuation of said spiral-shaped member and situated within an opening formed in said bottom, an angular member forming a continuation of said spiral-shaped member and situated within a corresponding opening formed in said base, another member carried by said spiral-shaped member adjacent said cover, the last-mentioned member being provided with a plurality of bores, a separate pin situated within each bore, and a separate spring situated within each bore and pressing against the bottom of the bore and said pin, at least some of said pins and the openings formed in said cover being situated at equal distances from a common central vertical axis, said springs pressing said pins against the walls of said openings to scrape the same during the relative movement between said spiral-shaped member and said body.

WERNER F. OTTE.